United States Patent
Griffin et al.

(10) Patent No.: US 11,766,661 B2
(45) Date of Patent: Sep. 26, 2023

(54) MATERIALS AND METHODS FOR IMPROVED PYROLYSIS PROCESSING

(71) Applicant: Alliance for Sustainable Energy, LLC, Golden, CO (US)

(72) Inventors: Michael Brandon Griffin, Denver, CO (US); Calvin Mukarakate, Arvada, CO (US); Maarit Kristiina Iisa, Golden, CO (US); Abhijit Dutta, Littleton, CO (US); Joshua A. Schaidle, Arvada, CO (US); Andrew Nolan Wilson, Denver, CO (US); Mark R. Nimlos, Golden, CO (US); Matthew Maurice Yung, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 133 days.

(21) Appl. No.: 17/191,370

(22) Filed: Mar. 3, 2021

(65) Prior Publication Data
US 2021/0316276 A1    Oct. 14, 2021

Related U.S. Application Data

(60) Provisional application No. 62/984,614, filed on Mar. 3, 2020.

(51) Int. Cl.
*B01J 23/42* (2006.01)
*B01J 35/10* (2006.01)
(Continued)

(52) U.S. Cl.
CPC .............. *B01J 23/42* (2013.01); *B01D 53/02* (2013.01); *B01J 21/063* (2013.01); *B01J 35/08* (2013.01);
(Continued)

(58) Field of Classification Search
CPC . B01J 23/42; B01J 21/063; B01J 35/08; B01J 35/1014; B01J 35/1038;
(Continued)

(56) References Cited

U.S. PATENT DOCUMENTS 7,485,748 B2 * 2/2009 Weigel .................. C07C 319/20
562/581
10,364,322 B2    7/2019 Nimlos et al.
(Continued)

FOREIGN PATENT DOCUMENTS

JP    2009112960 A *    5/2009
WO    2021/127612 A1    6/2021

OTHER PUBLICATIONS

Zhang et al. (Catalytic performance and mechanism of a Pt/TiO2 catalyst for the oxidation of formaldehyde at room temperature, Applied Catalysis B: Environmental, 2006) (Year: 2006).*

(Continued)

*Primary Examiner* — Colin W. Slifka
*Assistant Examiner* — Logan Edward Laclair
(74) *Attorney, Agent, or Firm* — Michael A. McIntyre

(57) ABSTRACT

The present disclosure relates to a catalyst that includes a support that includes a metal oxide and a metal deposited on the support, where the metal oxide includes at least one of $TiO_2$, $Al_2O_3$, $SiO_2$, $CeO_2$, and/or $ZrO_2$, the metal includes at least one of Pt, Pd, Ru Rh, Ni, and/or Mo, the metal is in the form of a particle, and the metal is present on the support at a concentration between about 0.1 wt % and about 5.0 wt %.

12 Claims, 13 Drawing Sheets

(51) Int. Cl.
*B01D 53/02* (2006.01)
*B01J 21/06* (2006.01)
*B01J 35/08* (2006.01)

(52) U.S. Cl.
CPC ....... *B01J 35/1014* (2013.01); *B01J 35/1038* (2013.01); *B01J 35/1042* (2013.01); *B01J 35/1057* (2013.01)

(58) Field of Classification Search
CPC ... B01J 35/1042; B01J 35/1057; B01D 53/02; B01D 2257/7022
See application file for complete search history.

(56) References Cited

U.S. PATENT DOCUMENTS

| 10,392,567 B2 | 8/2019 | Ruddy et al. |
| 2019/0225497 A1 | 7/2019 | Baldwin et al. |
| 2020/0291163 A1 | 9/2020 | Wilson et al. |

OTHER PUBLICATIONS

Uner et al. (Oxygen adsorption on Pt/TiO2 catalysts, Applied Catalysis A, 2003) (Year: 2003).*
Dutta et al., "Process Design and Economics for the Conversion of Lignocellulosic Biomass to Hydrocarbon Fuels Thermochemical Research Pathways with In Situ and Ex Situ Upgrading of Fast Pyrolysis Vapors", NREL Technical Report, NREL/TP-5100-62455, Mar. 2015, pp. 1-275.
Dutta et al., "Ex Situ Catalytic Fast Pyrolysis of Lignocellulosic Biomass to Hydrocarbon Fuels: 2018 State of Technology and Future Research", Technical Reports, NREL/TP-5100-71954, Oct. 2018, pp. 1-43.
Griffin et al., "Driving towards cost-competitive biofuels through catalytic fast pyrolysis by rethinking catalyst selection and reactor configuration", Energy & Environmental Science, 2018, vol. 11, No. 10, pp. 2904-2918.
Jones et al., "Process Design and Economics for the Conversion of Lignocellulosic Biomass to Hydrocarbon Fuels Fast Pyrolysis and Hydrotreating Bio-oil Pathway", PNNL Technical Paper PNNL-23053, Nov. 2013, pp. 1-97.
Schaidle, "Production of a Versatile, Renewable Refinery Feedstock", Presentation for Energy Venture Summit, Colorado School of Mines, March 3, 3030, pp. 1-20.

* cited by examiner

MATERIALS AND METHODS FOR IMPROVED PYROLYSIS PROCESSING

CROSS-REFERENCE TO RELATED APPLICATIONS

This application claims priority from U.S. Provisional Patent Application No. 62/984,614 filed on Mar. 3, 2020, the contents of which is incorporated herein by reference in its entirety.

CONTRACTUAL ORIGIN

This invention was made with government support under Contract No. DE-AC36-08GO28308 awarded by the Department of Energy. The government has certain rights in the invention.

SUMMARY

An aspect of the present disclosure is a catalyst that includes a support that includes a metal oxide and a metal deposited on the support, where the metal oxide includes at least one of $TiO_2$, $Al_2O_3$, $SiO_2$, $CeO_2$, and/or $ZrO_2$, the metal includes at least one of Pt, Pd, Ru Rh, Ni, and/or Mo, the metal is in the form of a particle, and the metal is present on the support at a concentration between about 0.1 wt % and about 5.0 wt %. In some embodiments of the present disclosure, the catalyst may be at least partially crystalline. In some embodiments of the present disclosure, the catalyst may be between about 80 wt % crystalline and about 99 wt % crystalline.

In some embodiments of the present disclosure, the metal may be deposited on a surface of the metal oxide. In some embodiments of the present disclosure, the surface may include an external surface and/or an internal surface. In some embodiments of the present disclosure, the catalyst may further include a surface area between about 35 $m^2/g$ and about 200 $m^2/g$. In some embodiments of the present disclosure, the surface area may be between about 35 $m^2/g$ and about 75 $m^2/g$. In some embodiments of the present disclosure, the catalyst may further include a pore volume between 0.20 $cm^3/g$ and 0.55 $cm^3/g$. In some embodiments of the present disclosure, the catalyst may further include a median pore diameter between 290 Å and 380 Å.

In some embodiments of the present disclosure, the catalyst may have a characteristic length between about 300 μm and about 1200 μm. In some embodiments of the present disclosure, the catalyst may have a characteristic length between about 470 μm and about 550 μm. In some embodiments of the present disclosure, the catalyst may be in a form comprising at least one of a sphere, a cylinder, a pellet, a trilobe, a quadrilobe, and/or an irregular shape. In some embodiments of the present disclosure, the metal particle may have a characteristic length between about 0.5 nm and about 20 nm. In some embodiments of the present disclosure, the catalyst may include a surface area between about 50 $m^2/g$ and about 60 $m^2/g$, a pore volume between about 0.30 $cm^3/g$ and about 45 $cm^3/g$, and a median pore diameter between about 300 Å and about 360 Å, where the metal oxide includes $TiO_2$, the metal includes Pt, and the concentration of the metal on the support is about 0.5 wt %.

An aspect of the present disclosure is a method that includes treating a pyrolysis vapor in an upgrading unit to produce an upgraded pyrolysis product that includes an oxygenated compound, where the treating includes contacting the pyrolysis vapor with a catalyst. The catalyst includes a support of a metal oxide, and a metal deposited on the support, where the metal oxide includes at least one of $TiO_2$, $Al_2O_3$, $SiO_2$, $CeO_2$, and/or $ZrO_2$, the metal includes at least one of Pt, Pd, Ru Rh, Ni, and/or Mo, and the metal is present on the support at a concentration between 0.1 wt % and 10 wt %. In some embodiments of the present disclosure, the treating may be performed in a packed bed reactor.

In some embodiments of the present disclosure, the packed bed reactor may include a first reactor and a second reactor, such that while the first reactor is treating, the second reactor is regenerating the catalyst, and while the second reactor is treating, the first reactor is regenerating the catalyst. In some embodiments of the present disclosure, the packed bed reactor may be operated at a pressure between about 1 Barr and about 10 Barr. In some embodiments of the present disclosure, the packed bed reactor may be operated at a weight hourly space velocity between about 1.0 grams of biomass per gram of catalyst per hour and about 5.0 grams of biomass per gram of catalyst per hour. In some embodiments of the present disclosure, the method may further include cofeeding with the pyrolysis vapor a gas stream that includes hydrogen at a concentration between about 50 wt % and about 100 wt %.

An aspect of the present disclosure is a method that includes separating a pyrolysis-derived oxygenate from a stream, where the separating is performed using adsorption.

BRIEF DESCRIPTION OF THE DRAWINGS

Some embodiments are illustrated in referenced figures of the drawings. It is intended that the embodiments and figures disclosed herein are to be considered illustrative rather than limiting.

Figure 1:
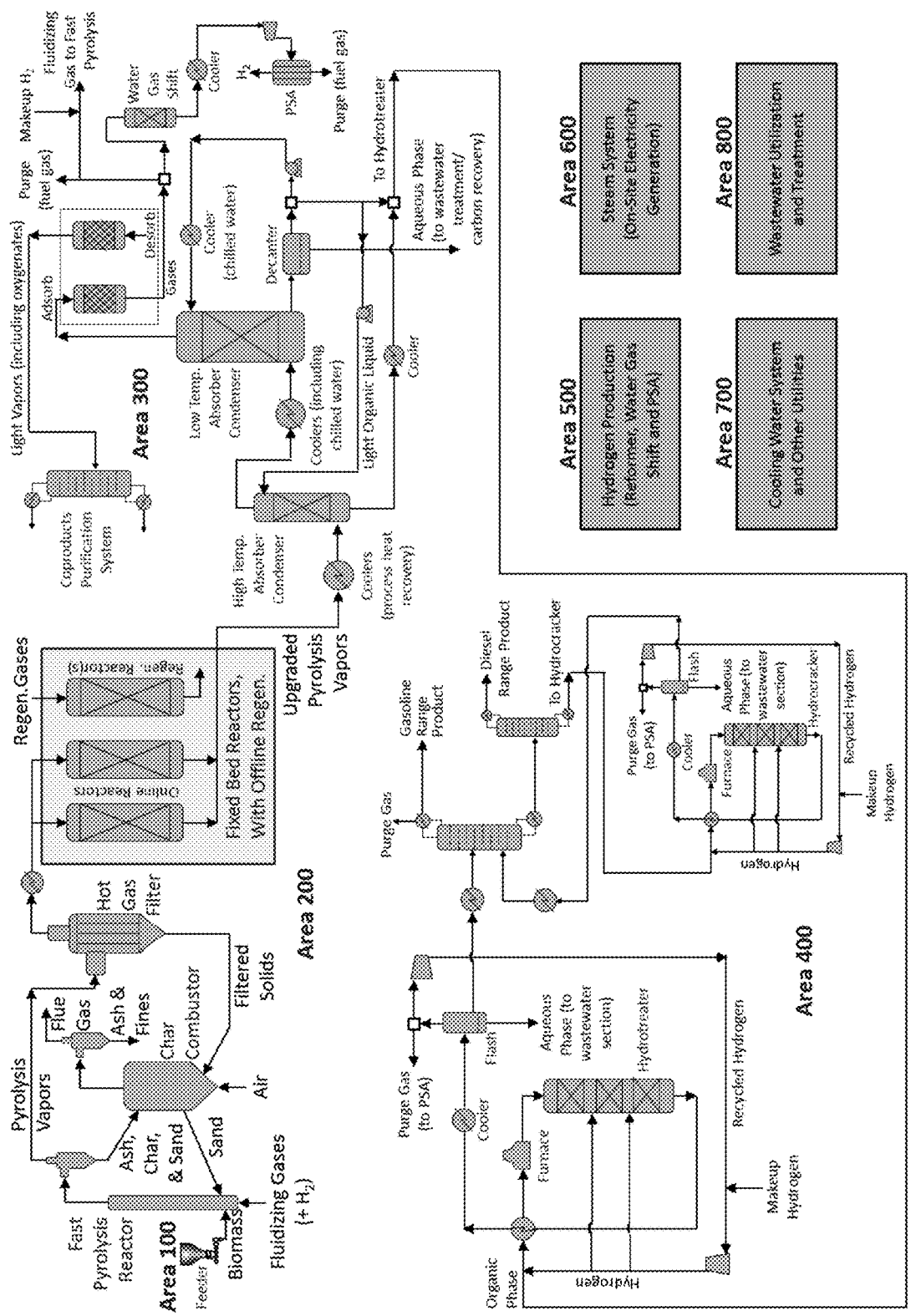
FIG. 1 illustrates a process flow diagram for a fixed bed ex situ catalytic fast pyrolysis process, according to some embodiments of the present disclosure.

| REFERENCE NUMBERS | |
| --- | --- |
| 200 | system |
| 205 | biomass |
| 210 | pyrolysis unit |
| 215 | pyrolysis vapor |
| 220 | upgrading unit |
| 225 | upgraded pyrolysis product |
| 230 | condensation process |
| 235 | light phase |
| 237 | heavy phase |
| 240 | adsorption unit |
| 245 | oxygenated compounds |
| 247 | byproduct |
| 250 | reactor |
| 255 | higher molecular weight product |
| 800 | unsaturated compound |

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates generally to the conversion of biomass to useful fuels and/or chemicals. Specifically, the present disclosure relates to aspects of an ex-situ catalytic fast pyrolysis (CFP) process/system/method for converting biomass to useful fuels and/or chemicals. An aspect of the present disclosure relates to structured catalysts, e.g., platinum on a $TiO_2$ support, that is capable of upgrading pyrolysis vapors to valuable fuels and/or co-products. In addition, as shown herein, an aspect of the present disclosure, includes a solid adsorbent capable of preferentially separating valuable oxygen-containing molecules (e.g., acetaldehyde, acetone, and/or methyl ethyl ketone) from a stream originating from the CFP system where, subsequently, these molecules may be sold and/or further processed by coupling reactions and/or hydrogenation reactions to produce higher molecular weight products (e.g., fuels and/or chemicals). FIG. 1 illustrates a flow diagram of an exemplary CFP process, according to some embodiments of the present disclosure.

This exemplary system includes eight process areas, with four core process areas as follows:
A100: Feedstock handling;
A200: Fast pyrolysis, hot gas filtration, and ex situ catalytic vapor upgrading;
A300: CFP product condensation (with the separation of the organic liquid CFP oil from an aqueous wastewater stream and use of separated permanent gases in the process) where oxygenated molecules recovery and purification are included in this area; and
A400: CFP oil hydrotreating, hydrocracking, and product distillation.

Support process areas, which are not discussed herein, may include:
A500: Hydrogen production (from process off-gases);
A600: Steam system and electricity generation (from available excess heat);
A700: Cooling water and other utilities; and
A800: Wastewater utilization and treatment (regenerative thermal oxidizer used to combust the organic content in the wastewater).

Referring to Area 100 of FIG. 1, in some embodiments of the present disclosure, biomass fed to the pyrolysis reactor may include any suitable feedstock including at least one of wood, agricultural waste, municipal solid waste, and/or forest waste. Examples of wood include pine, poplar, and the like. In some embodiments of the present disclosure, the biomass fed to the system may include forest residues blended with pine. In some embodiments of the present disclosure, the moisture content of a biomass containing wood may be about 10% and have an ash content of about 1.75%. In some embodiments, the feedstock may be reduced to a nominal particle size of about 2 mm. In some embodiments of the present disclosure, the feedstock handling area may include a crossflow dryer for warming the feedstock prior to feeding the biomass to the fast pyrolysis reactor.

In some embodiments of the present disclosure, the feedstock directed to the CFP reactor may include a mix of clean pine and forest residue(s). This exemplary material, including forest residues, can be made to compositionally resemble clean pine by undergoing a process of air classification and leaching. Such a process can result in forest residues that have an overall ash content of less than 0.9 wt % and an alkali and alkaline earth metal (AAEM) content of less than 1,300 ppm, which is similar to average values for clean pine. In some embodiments of the present disclosure, a feedstock may include a blend of clean pine and air-classified and leached forest residues that meet the quality specifications for catalytic fast pyrolysis. Blending 25% clean pine with 75% forest residue results in a low-cost material with an ash content of 0.51 wt % and an AAEM content of less than 1,300 ppm.

Referring again to FIG. 1, Area 200 includes a circulating fluidized bed fast pyrolysis reactor and a catalytic vapor upgrading system, in this example, including a bank of three fixed bed reactors. The pyrolysis system includes a riser reactor for fast pyrolysis of biomass at a temperature between about 400° C. and about 600° C., with short biomass residence times between about 1 second and about 10 seconds in the riser, and a char combustor for providing heat to the endothermic fast pyrolysis reactions; circulating sand is heated in the char combustor and sent to the riser reactor where it heats the biomass to pyrolysis temperatures. Along with biomass and other fluidizing gases, $H_2$ is also fed to the pyrolyzer. The solids (char and mineral matter) from the fast pyrolysis may be removed from the hot vapors by cyclones. An additional hot gas filter (HGF) may be included to remove any residual solids. This HGF is important because residual solids from the pyrolysis can easily plug the downstream fixed bed ex situ catalytic vapor upgrading reactors. As described herein, the catalytic fixed bed reactor system, for the upgrading of pyrolysis vapor, may include a Pt/TiO$_2$ catalyst at a concentration between about 0.1 wt % and about 5.0 wt %.

A CFP bench-scale experimental setup was used to test these concepts, using a 2-inch fluidized pyrolyzer, followed by an HGF, and a fixed bed pyrolysis vapor upgrading reactor containing Pt/TiO$_2$ catalyst. A 50% forest residues/50% clean pine blend was converted at a fast pyrolysis temperature between about 400° C. and about 600° C., the fixed bed ex situ pyrolysis vapor upgrading reactor setpoint temperature was maintained at a temperature between about 400° C. and about 600° C., and the biomass:catalyst (B:C) ratio was maintained between about 3:1 and about 15:1. The catalyst had a concentration between about 0.1 wt % and about 5.0 wt % Pt on a TiO$_2$ support. CFP oil with an oxygen content between about 14 wt % and about 20 wt %, on a dry basis, was produced with a carbon yield between about 30% and about 40%. Coke yield was between about 1.6 wt % and about 2.2 wt %. In addition to the CFP oil, 10-13 wt % of the biomass carbon was present as condensable oxygenates in the vapor phase stream. This light oxygenate stream consisted primarily of three compounds: acetone with a carbon yield between 3.0% and wt %, acetaldehyde with a carbon yield between about 2.0% and about 4.0%, and methyl ethyl ketone (MEK) with a carbon yield between about 1.0 wt % and about 2.0 wt %.

Referring again to FIG. 1, Area 300 receives the upgraded pyrolysis products and separates them into various streams. In this exemplary system, two direct quench absorber/condensers are provided. The upgraded vapors from the ex-situ reactors may be initially cooled via indirect heat exchange up to the dew point of the vapor stream. A heavy organic liquid may then be condensed in the first absorber/condenser; the light organic liquid product from the second condenser may be used as the quench liquid. The uncondensed light vapors from the first condenser, as well as the vaporized quench liquid may then be sent through heat exchangers. The partially condensed vapors may enter the second absorber/condenser column for a final quench using a stream of recycled (and cooled) light organic liquid. The bottom product of the second condenser may be separated into an aqueous waste stream (sent to Area 800) and an organic product. As previously mentioned, part of this light organic liquid product may also be recycled for use as a quench liquid for both the absorber/condensers. In this design, the heavy organic liquid from the first condenser and light organic liquid from the second condenser may be mixed and sent to Area 400 for hydroprocessing. However, for co-hydroprocessing, these two streams may be kept separate and co-processed with different refinery streams based on compatible carbon numbers. In some embodiments of the present disclosure, organic species may be recovered from the aqueous phase, or the carbon in the waste stream may be combusted as a method of wastewater treatment.

As described in more detail below, Area 300 also includes the recovery of light oxygenates from the gaseous stream exiting the second condenser. In an exemplary process design, the gaseous stream from the second condenser may be sent to an adsorption system to remove the light oxygenates and other species, while letting the lighter gases pass through. The adsorbed species may then be desorbed in a temperature and/or pressure swing system. The desorbed stream may subsequently be sent to a series of distillation columns to recover, among other compounds, acetone and MEK as coproducts. In addition, as described in more detail below, the desorbed compounds may be reacted in downstream coupling reactions to produce higher molecular weight products; e.g. fuels and/or chemicals. Area 400, corresponding to CFP oil hydroprocessing, may then reduce the oxygen content of the CFP oil to less than 1 wt % after a single hydrotreating step.

Figure 2:
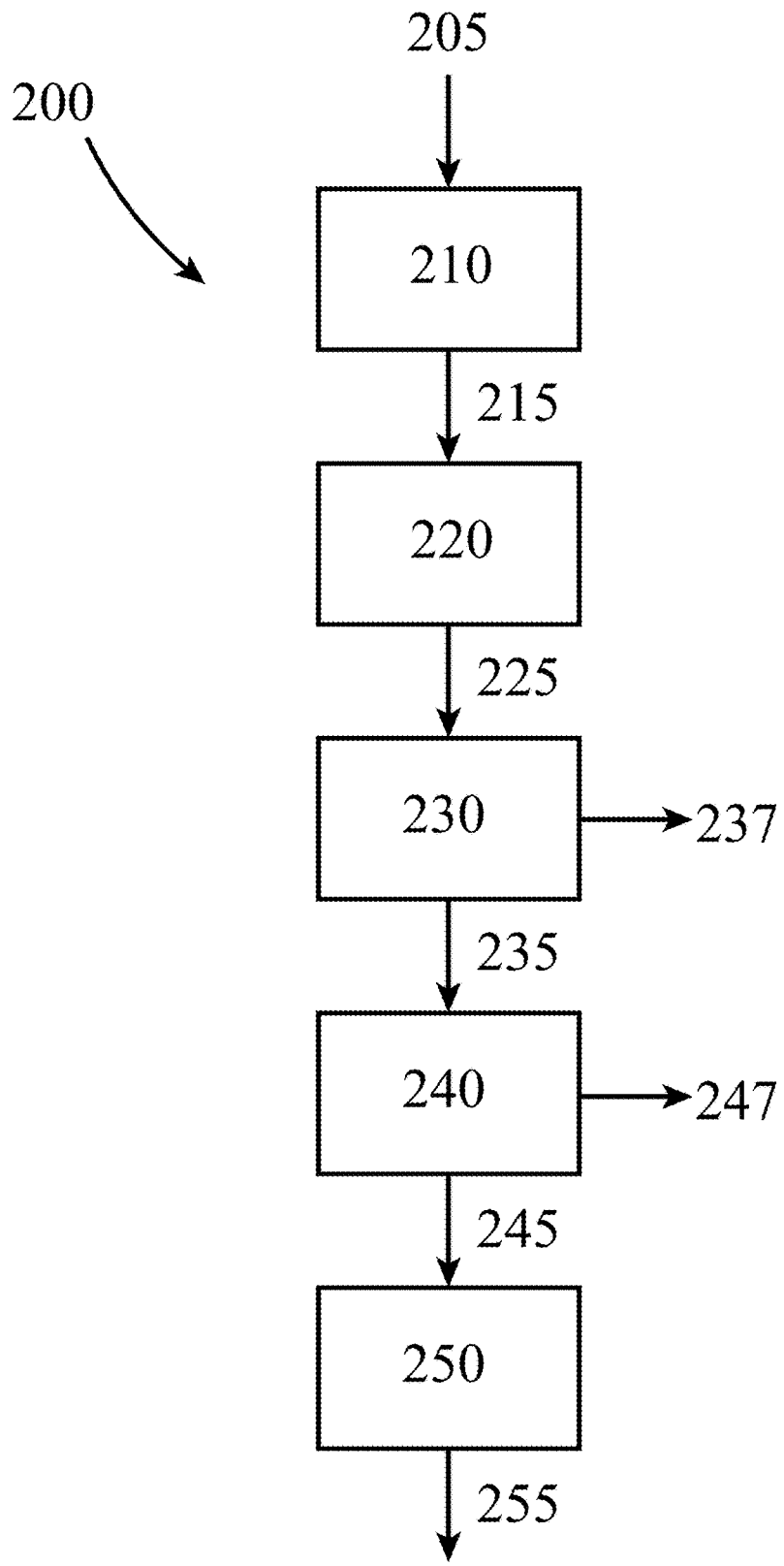
FIG. 2 illustrates a system for converting biomass to valuable oxygenated compounds, according to some embodiments of the present disclosure.

FIG. 2, a simplified summary of FIG. 1, illustrates a system 200 that includes a series of unit operations, starting with a pyrolysis unit 210 that converts biomass 205 to pyrolysis vapor 215. As described above, biomass 205 may include at least one of wood (e.g., pine) and/or forest waste. In some embodiments of the present disclosure, hydrogen (not shown) is directed with the biomass 205 to the pyrolysis unit 210 and participates in the pyrolysis reaction. The pyrolysis unit 210 may include a fluidized bed system utilizing a circulating inventory of hot sand heated by combusting the char produced by the pyrolysis process. The pyrolysis vapor 215 may be treated to remove ash, char, and sand (e.g., using a cyclone) and then subsequently passed through a hot gas filter to remove any remaining solids. Filtration of the pyrolysis vapor reduces the concentration of inorganic materials that may lead to catalyst deactivation, so that the filtered pyrolysis vapor 215 may then be directed to an upgrading unit 220 where the compounds contained in the pyrolysis vapor 215 are at least partially converted, by contacting them with a solid catalyst, to an upgraded pyrolysis product 225. As described above, the upgraded pyrolysis product 225 may then be directed to a condensation process 230 that separates the upgraded pyrolysis product 224 into a light phase 235 and a heavy phase 237. The light phase 235 may then be directed to an adsorption unit 240 that separates the light phase 235 into a light oxygenate stream consisting primarily of acetone, acetaldehyde, and MEK 245 and a byproduct stream 247 consisting primarily of permanent gasses such as but not limited to $N_2$, $H_2$, $CO_2$, CO, and $CH_4$. Finally, the light oxygenate stream 245 may be directed to a reactor 250 where the oxygenated compounds are reacted, e.g., coupled, to produce higher molecular weight products 255.

As described above, an aspect of the present disclosure is a structurally unique catalytic material, which enables improved performance and extended online time prior to regeneration during the conversion of biomass pyrolysis vapors into valuable fuels and co-products in the upgrading unit 220 of FIG. 2. In some embodiments of the present disclosure, such a catalyst includes a solid high surface area crystalline $TiO_2$ support with a tailored porous morphology, as defined by pore size and pore volume, with a highly dispersed platinum active phase positioned on the $TiO_2$ support. As described herein, examples of this solid catalyst enable improved process yield, high product quality, more than 400% improvement in catalyst online time prior to regeneration, and a 50% reduction in Pt requirements compared to incumbent solid catalysts. A contributing factor to the improved performance of the catalyst described herein is hypothesized, without wishing to be bound by theory, to be enhanced diffusion of reactants and products within the pore structure of the material. Importantly, the extended online time of this material pushes the technology towards an operational regime in which a "swing bed reactor" configuration may be utilized. As defined herein, "a swing bed reactor" involves at least two reactors which are cycled between a regeneration mode and a catalyzing mode; e.g. one reactor is removed from service for regeneration while a freshly regenerated reactor is simultaneously returned to service.

Table 1 illustrates the physical properties of incumbent solid catalysts typically used for pyrolysis vapor upgrading. Table 2 illustrates the physical properties of a representative improved catalyst described herein for the upgrading of pyrolysis vapor. Table 3 compares the performances of these two catalysts for CFP, as described in more detail below. The properties provided in Table 1 and 2 relate to the $TiO_2$ supports and may change slightly during Pt deposition and pretreatment. In summary, a comparison of oil compositions demonstrates that the utilization of a solid catalyst containing tailored porosity, with materials described herein, produces products having lower oxygen content, at improved yields, with a greater than 400% improvement in time on stream, while utilizing 50% less platinum compared to the typical incumbent catalyst.

TABLE 1

Properties of Incumbent $TiO_2$ Support

| Property | 1.6 mm Pellets |
|---|---|
| XRD | Mixed Phase |
| $NH_3$-TPD, µmoles $g^{-1}$ | 260 |
| Surface area, $N_2$, $m^2$/g | 52.0 |
| Pore volume $cm^3$/g | 0.37 |
| Median pore diameter, Å | 282 |
| Chemical analysis | 99 wt % $TiO_2$ |
| Packing density, g/$cm^3$ | 0.95-0.115 |
| Particle size, mm | 1.6-1.7 |
| Side Crush Strength, N | >30 |

TABLE 2

Properties of Improved $TiO_2$ Support

| Property | Nominal Values | Ranges |
|---|---|---|
| XRD | Mixed Phase | |
| $NH_3$-TPD, µmoles $g^{-1}$ | 156 | 100 to 200 |
| Surface area, $N_2$, $m^2$/g | 54.0 | 35 to 75 |
| Pore volume $cm^3$/g | 0.37 | 0.20 to 0.55 |
| Median pore diameter, Å | 328 | 290 to 380 |
| Chemical analysis, ppm | | |
| CaO | <10 | |
| $Fe_2O_3$ | <10 | |
| $Na_2O$ | <10 | |
| Packing density, g/$cm^3$ | 0.90 | |
| Attrition, Wt % | 47.6 | |
| Particle size distribution, µm | 509 | 474-546 |
| <300 µm Vol, % | 0.0 | |
| d10 | 474 | |
| d50 | 509 | |
| d90 | 546 | |
| Span, % | 14.1 | |
| Sphericity, % | 96.1 | |

TABLE 3

A comparison of oil compositions resulting from different catalysts

| | Incumbent | Novel Catalyst |
|---|---|---|
| Catalyst Description | 1% Pt/$TiO_2$ | 0.5% Pt/$TiO_2$ |
| Catalyst size and shape | 1.6 mm pellets | 0.5 mm spheres |
| Catalyst CO Binding Site Density (µmol/g) | 14 | 19 |
| Support $NH_3$ Binding Site Density (µmol/g) | 260 | 156 |
| Feed | Woody Biomass | Woody Biomass + Forest Residues |
| Biomass:Catalyst, g/g | 3 | 12 |
| Oil elemental composition | | |
| C, wt % db | 74% | 77% |
| H, wt % db | 8% | 7% |
| N, wt % db | 0.1% | 0.2% |
| O, wt % db | 18% | 15% |
| $H_2O$, wt % | 4.4% | 2.2% |
| H:C, mol/mol db | 1.24 | 1.21 |
| O:C, mol/mol db | 0.18 | 0.16 |
| Yield of oil, g/g dry biomass | 25% | 24% |
| C yield of oil, g C/g C in biomass | 37% | 35% |

As described above, an aspect of the present disclosure is a structurally unique catalytic material, which enables improved performance and extended online time prior to regeneration during the fixed bed chemical conversion of biomass pyrolysis vapors into valuable fuels and co-products. The performance of a 0.5 wt % Pt/$TiO_2$ catalyst with tailored porosity provides a representative example of the potential process improvements (e.g., extended lifetime, reduction in Pt requirement). Other embodiments of this disclosure may include different metals (e.g., at least one of Pd, Ru Rh, Ni, and/or Mo) and/or different metal oxides (e.g., at least one of $Al_2O_3$, $SiO_2$, $CeO_2$, and/or $ZrO_2$). Likewise, the range of metal loading may be between about 0.1 wt % and about 10 wt %, and the optimal physical properties discussed in Tables 1 and 2 may vary depending on the specific metal and/or metal-oxide.

Figure 3:
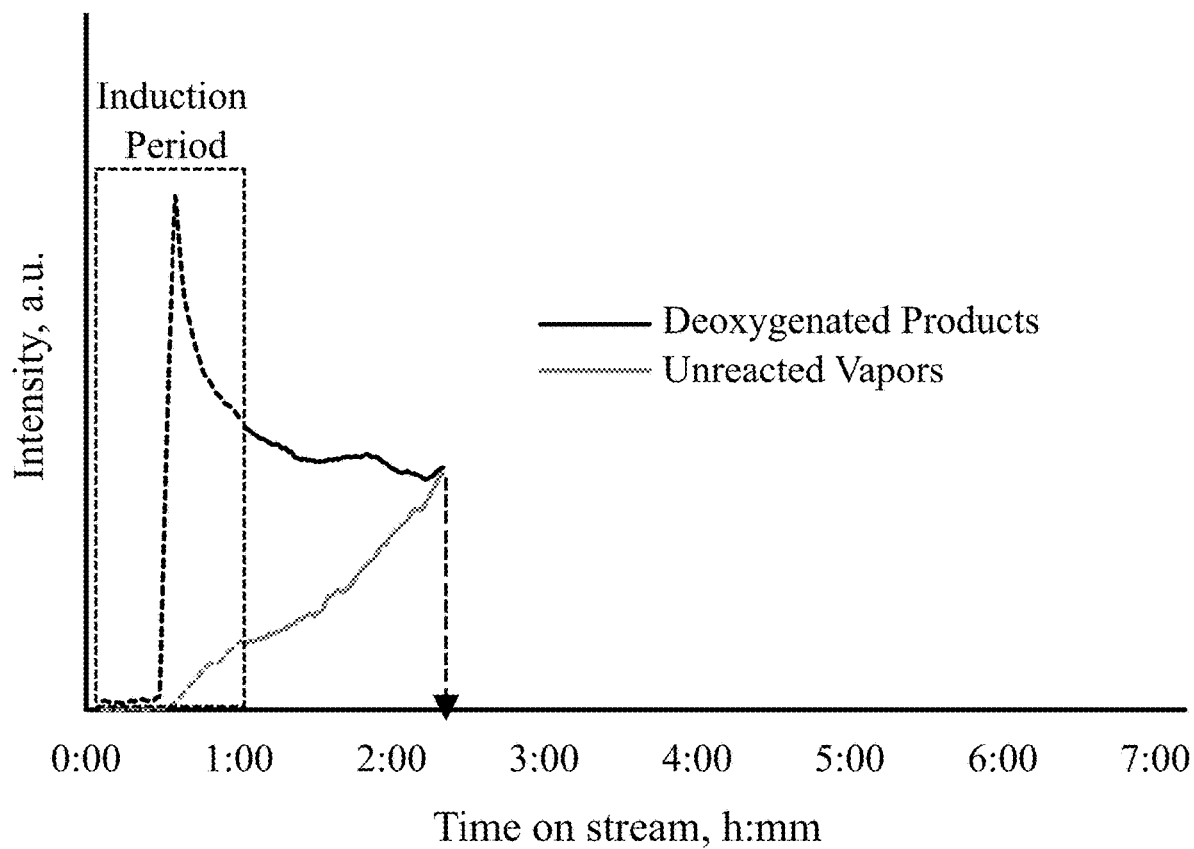
FIG. 3 illustrates online catalytic fast pyrolysis (CFP) vapor upgrading using an incumbent solid catalyst.
Figure 4:
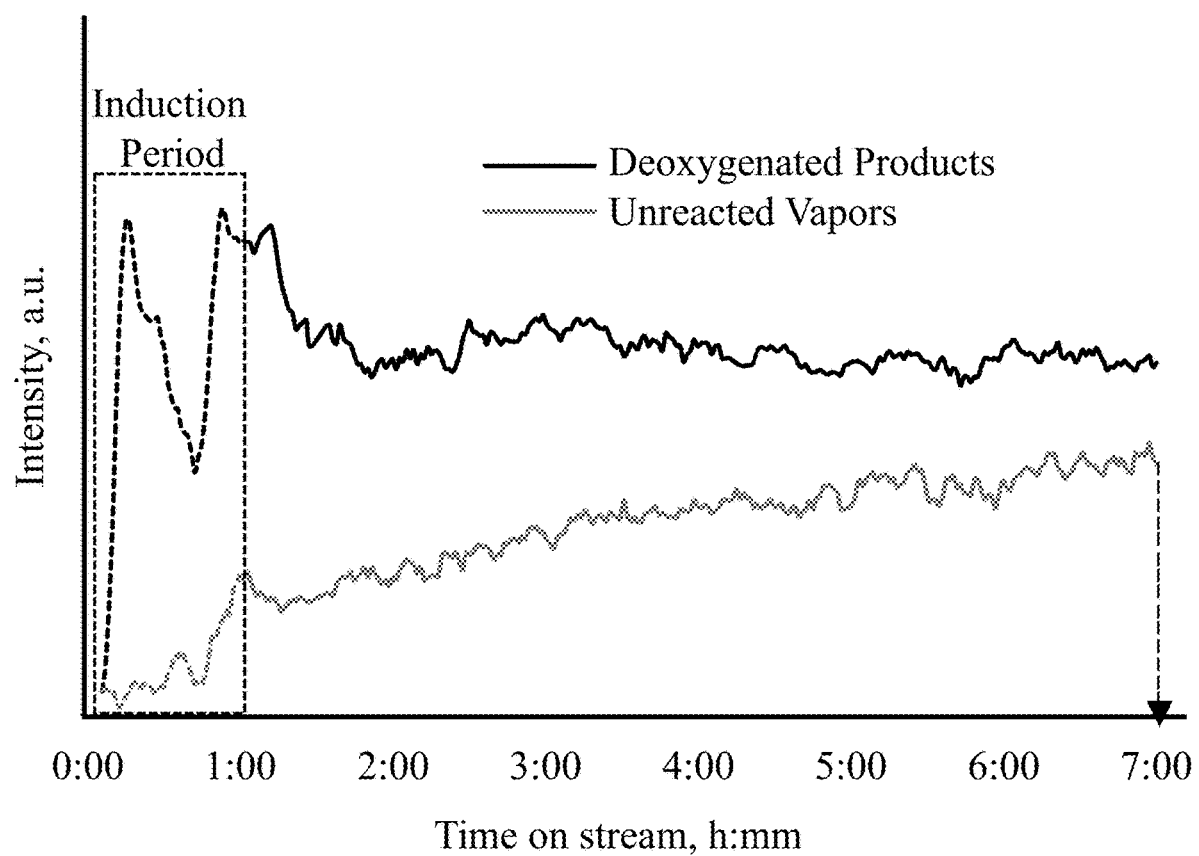
FIG. 4 illustrates online CFP vapor upgrading using a titania-supported platinum catalyst, according to some embodiments of the present disclosure.

Catalytic fast pyrolysis (CFP) experiments were conducted in a dual reactor system with a fluidized bed pyrolyzer (i.e., pyrolysis unit 210) coupled to a catalytic fixed-bed reactor (i.e., upgrading unit 220) and a hot-gas filter between the two reactors, where the catalysts described above were tested in the catalytic fixed bed reactor. Biomass was pyrolyzed in the 5.2-cm inner diameter bubbling fluidized bed reactor, char was separated in a cyclone and fines in the hot-gas filter. The catalyst ($Pt/TiO_2$) was placed in the fixed-bed reactor having an internal diameter of 3.2 cm, and the hot pyrolysis vapors and gases were passed through the fixed-bed reactor containing the catalyst. The upgraded vapors from the reactor were condensed in a condensation train consisting of an air-cooled condenser, an electrostatic precipitator (ESP), a dry-ice trap, an iced coalescing filter, and a second dry-ice trap. The pyrolysis and upgrading reactor set-point temperatures were about 500° C. and about 400° C., respectively. The catalyst mass in the upgrading reactor was between about 90 g and about 93 g; biomass was fed to the pyrolysis reactor at a rate of about 150 g/h and gases with a combined composition of about 85% $H_2$/15% $N_2$ were fed at a rate of about 16 standard liters/min during the catalytic cycle. Before each catalytic cycle in the upgrading reactor, the catalyst was pre-reduced in the 85% $H_2$/15% $N_2$ gas flow at about 450° C. for one hour and, after each experiment, the catalyst was regenerated in a flow of air and nitrogen mixture. The air flow was adjusted to keep the catalyst temperature below about 500° C. during the regeneration. The composition of the upgraded vapors was measured by a residual gas analyzer after the fixed-bed reactor. The liquids collected in the receivers from the condensation train separated into an organic oil and an aqueous phase, and the yields and elemental composition of the liquids were determined, with the oil phase properties summarized above in Table 3. FIGS. 3 and 4 compare the concentration of upgrading and un-reacted pyrolysis vapors collected for the incumbent catalyst to the corresponding data collected for the novel catalyst described herein, respectively (see Tables 1-3 above). FIG. 3 illustrates a rapid deactivation of the incumbent catalyst, whereas FIG. 4 illustrates a more then 4-fold increase in catalyst onstream time prior to regeneration. Process conditions for these tests were maintained at a pressure between about 1 Barr and about 10 Barr (nominal value about 1 Barr), a weight hourly space velocity between about 1.0 grams biomass/grams catalyst*hour and about 5.0 grams biomass/grams catalyst*hour (nominal value about 1.5 grams biomass/grams catalyst*hour), with a hydrogen feed concentration between about 50% and about 100% (nominal value about 83%). Feed flowed through the vertical oriented reactor from the top downwards.

Referring again to FIGS. 3 and 4, two different biomass feedstocks, each using a different type of $TiO_2$ support for the catalyst in the pyrolysis vapor upgrading reactor. First, pyrolysis vapor obtained from clean pine was upgraded over 1% platinum on a support of $TiO_2$ extrudates with a diameter of 1.7 mm. The experiment was continued until the ratio of biomass fed to catalyst mass was 3 g/g (see FIG. 3). Second, pyrolysis vapor obtained from a blend of 50% clean pine and 50% forest residues was upgraded over 0.5% Pt on a support of 0.5 mm spheres of $TiO_2$. The experiment was continued until the ratio of biomass fed to catalyst mass was 12 g/g (see FIG. 4).

Titania supported platinum catalysts were synthesized via strong electrostatic adsorption using $Pt(NH_3)_4(NO_3)_2$ to target a nominal loading of 0.5 or 1.0 wt %. The $TiO_2$ support was soaked for more than 24 hours in an aqueous solution with a surface loading of 500 $m^2$ $L^{-1}$ ($5.7\times10^{-4}$ M Pt). During this process, the solution was continuously stirred and the pH of the was controlled at 11.5 using NaOH. After impregnation, the catalyst was dried at room temperature for more than 24 hours followed by a subsequent drying step at 60° C. for more than 8 hours. The dried catalyst was reduced in flowing 5% $H_2/N_2$ at 450° C. before characterization and reaction testing.

As described above, the present disclosure also relates to the treating of the upgraded pyrolysis product 225 (see FIG. 2), for example, after a condensation process 230 has removed at least some of the higher molecular weight compounds (heavy phase 237). In some embodiments of the present disclosure, this may include passing a light phase 235 from the condensation process 230 to an adsorption unit 240. Compounds contained in the light phase 235 may include at least one light oxygenate such as acetaldehyde, acetone, and/or methyl ethyl ketone. The production of these compounds may occur in the upgrading unit 220, at least partially, as a result of the titania-supported platinum catalyst described above, which appears to promote unique chemistries that are not observed using incumbent catalyst technology. For example, ketonization of undesirable carboxylic acids over the $TiO_2$ catalysts described herein are hypothesized to contribute to the comparatively high concentration of acetone observed in light phase streams resulting from the use of $Pt/TiO_2$ in the pyrolysis vapor upgrading reactor, compared to incumbent catalysts.

In some embodiments of the present disclosure, adsorption may be performed at relatively low temperatures to increase the capacity of the adsorbent. In some case, the adsorption unit 240 may be equipped for indirect heat transfer to remove heat (e.g., heat of adsorption). Desorption may be performed by heating the adsorption unit 240 to relatively higher temperatures and/or by lowering the unit's operating pressure. Specific temperatures and/or pressures for adsorbing and desorbing may be dictated by the selectivity of specific species. For example, acetone and MEK adsorption was conducted at 25° C., with additional temperatures being explored for optimization. In some embodiments of the present disclosure, an adsorption unit 240 may operate at a pressure at or above atmospheric pressure, with higher pressures potentially increasing the capacity of the adsorbent to adsorb the target compounds.

As shown below, the light oxygenate components resulting from the upgrading unit 220 may be effectively captured using a solid zeolite adsorbent in an adsorption unit 240, for example, a 13X molecular sieve. As shown herein, silica gel materials have also been demonstrated to be effective adsorbents. The data also support the ability to tune the relative amounts of the major oxygenates based on catalyst formulation (e.g., support), which provides tunability of the product formed in the upgrading unit 220. Subsequently, the captured oxygenates can be sold directly as renewable chemicals, or they can be further processed into biopolymers or fuel products under mild conditions. As described below, preliminary data indicate that the composition of the adsorbent and/or the adsorption unit 240 process conditions may be tailored to capture, selectively desorb, and upgrade the light oxygenate compounds in a single step. Such reactive-separation strategies represent a novel approach towards process intensification that may enable cost-advantaged upgrading routes.

In some embodiments of the present disclosure, compounds contained within the upgraded pyrolysis product 225 resulting from the treating of pyrolysis vapor 215 in an upgrading unit 220 may include acetaldehyde, acetone, methyl ethyl ketone (2-butanone), and/or furan. As shown in Table 4 below, the distribution of these compounds may depend strongly on the specifics of the catalyst used in the upgrading unit 220.

TABLE 4

Major products observed in the light oxygenate stream during CFP with Pt/TiO$_2$ catalysts

| Product (mol %) | Novel Pt/TiO$_2$ | Incumbent Pt/TiO$_2$ (Evonik) |
| --- | --- | --- |
| Acetaldehyde | 27 ± 2 | 42 ± 0.6 |
| Acetone | 40 ± 2 | 34 ± 0.3 |
| 2-Butanone | 12 ± 0.5 | 8 ± 1.1 |
| Furan | 5 ± 0.2 | 3 ± 0.1 |

Figure 5:
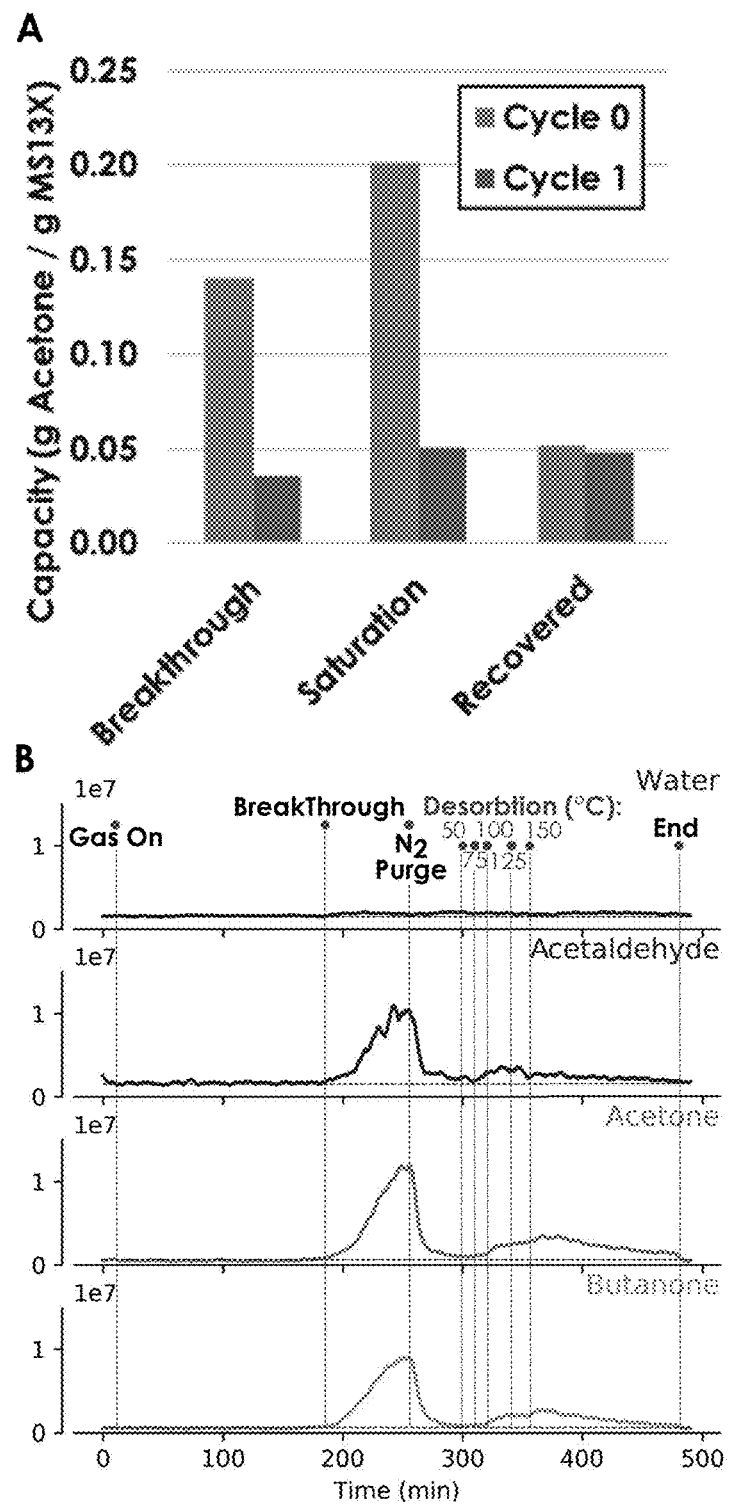
FIGS. 5 and 6 illustrates the desorption of acetone and hydrocarbon products observed during experiments performed using a molecular sieve 13X adsorbent, according to some embodiments of the present disclosure.

As shown below, experiments utilizing pure acetone demonstrate the ability to capture these reactive oxygenates using a 13X molecular sieve (i.e., zeolite). In these experiments, acetone was delivered in the gas phase in an inert gas stream that was saturated at room temperature using a bubbler. During adsorption, breakthrough of the acetone from the adsorption unit 240 outlet took about 66 minutes, which was 65 minutes longer than the control (5 mm glass beads having no adsorption capacity). The same adsorption media was exposed to a fresh acetone feed stream twice (regenerated once) to determine the recovered capacity via thermal cycling. Panel A of FIG. 5 shows the capacity at breakthrough to be about 14 wt % and about 4 wt % for the initial (Cycle 1) and subsequent cycle (Cycle 2), respectively (e.g., grams of acetone/grams of adsorbent×100). The amount of material recovered after desorption thermal cycling was approximately equal for the two cycles at a value of ~5 wt %. The optimal desorption temperature for acetone was determined to be about 150° C. using an inter gas purge at atmospheric pressure. At about 100° C., initial component ion signals were observed, indicating the onset of desorption. Above about 200° C., hydrocarbon products (benzene, toluene, xylene) were observed, indicating potential catalytic activity of the adsorbent. Pressure swing adsorption systems may also enhance acetone desorption. For example, after desorption at about 150° C., an additional 0.5 wt % recovery of acetone was achieved by decreasing the system pressure from about 15 psia to about 2 psia, while maintaining the system at about 150° C. A mixture of acetaldehyde, acetone, 2-butanone, and water demonstrated similar results to that of acetone (see Panel B of FIG. 5). During desorption of this mixture, it was shown that acetaldehyde began desorbing at about 75° C., while acetone and butanone began desorbing at about 100° C. A slight yellow discoloration of the adsorbent material was observed post-treatment. In view of the reactions observed using acetone, the adsorbent was only heated to about 150° C. during the mixture experiments in an attempt to prevent reactions from occurring. Importantly, as shown herein, experiments have demonstrated recoverable acetone uptake of nearly 20 wt %, demonstrating the potential for further optimization of the light oxygenate adsorption system.

Figure 6:
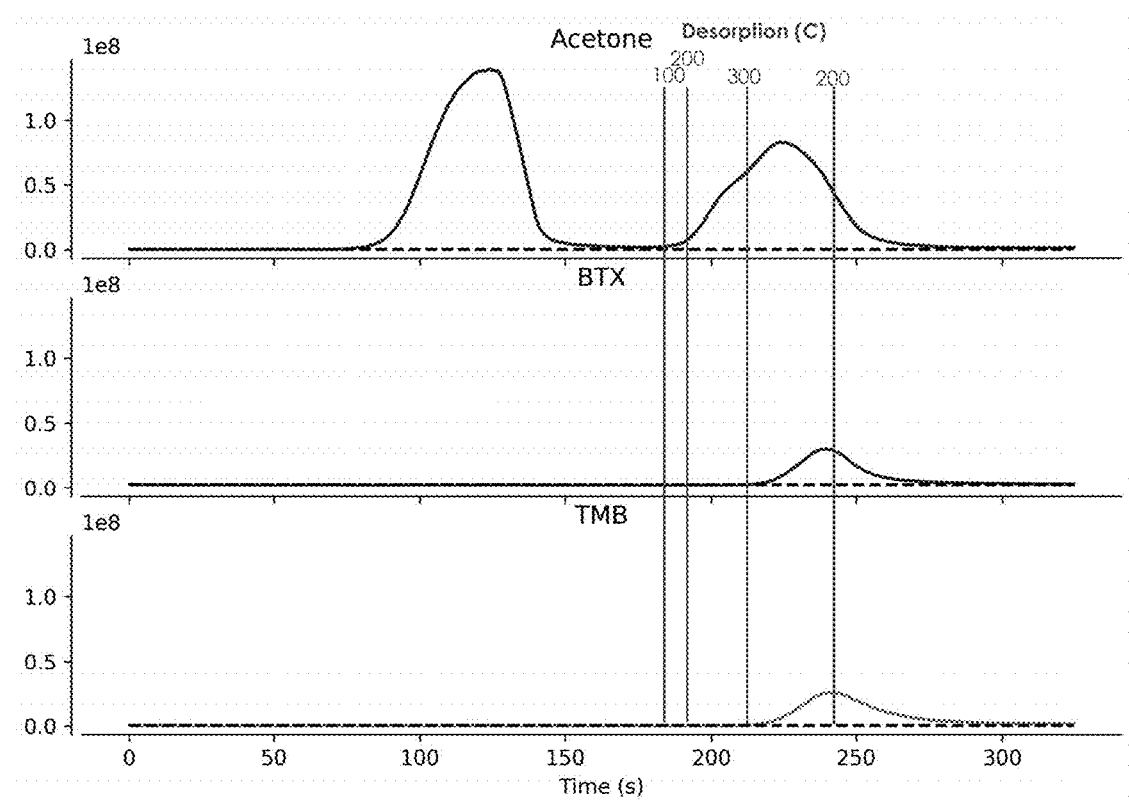

Adsorption and desorption were demonstrated for both pure acetone and the mixture of light oxygenates. The capacity difference between Cycle 1 and Cycle 2 is likely due to stronger binding of components—to the adsorbent. Additional material was recovered to some extent using pressure swing adsorption, as described above. The hydrocarbon products observed above about 200° C. can be influenced by the adsorbent, for example, a zeolite material (zeolite X type), can demonstrate catalytic properties at these elevated temperatures. During adsorption/desorption of the mixed stream, water was not detected. This is likely due to the low vapor pressure of water and the high capacity of the adsorbent for water. This simple set of experiments demonstrates the ability to capture light oxygenates from CFP vapors. Several important key observations were made: quantitative assessment of the cycling capacity using acetone, the ability to desorb compounds below catalytic temperatures, and the ability to adsorb/desorb a mixture of the major components in the vapor stream. FIG. 6 demonstrates selectivity control for the generation of hydrocarbons based on desorption temperature. Time points represent changes to the temperature setpoint. Acetone desorption was observed at temperatures near about 150° C., whereas hydrocarbon generation (e.g., BTX, TMB) was observed above about 200° C.

In addition, the present disclosure relates to reacting, e.g., coupling, the oxygenated compounds 245 recovered by the adsorption unit 240 in a reactor 250 to produce at least one higher molecular weight product 255 (see FIG. 2). Coupling of light oxygenates 245 via aldol condensation may occur over solid acid and/or base catalysts under mild reaction conditions. The resultant higher molecular weight product 255 may then be combined with CFP-oil for single-stage hydrotreating to produce fuel blends such as linear and/or branched paraffins, e.g., unsaturated compounds 800. Moreover, the production of linear and/or branched paraffins may provide an opportunity to improve fuel quality by boosting octane or cetane number, respectively.

Gas adsorption experiments were conducted using an in-house built gas sparging apparatus coupled to the catalytic hot-gas filter (CHGF) and MBMS system. The sparging apparatus was located upstream of the CHGF unit with the MBMS downstream of the unit. The sparging apparatus was comprised of a vessel equipped with an internal heat-exchanger (cold finger) and a sintered stainless-steel sparging stone located at the bottom of the vessel. Nitrogen (N$_2$) gas was sparged into acetone or a mixture of acetone, acetaldehyde, methyl ethyl ketone, and water to produce component vapor concentrations comparable to those observed in the effluent of the bench scale upgrading unit during CFP. 200 mL of acetone were used in the pure acetone experiments. For the mixed stream, the liquid phase was formulated such that the vapor composition matched experimental results from CFP data based on VLE calculations. The components were mixed at a volumetric ratio of about 10:20:20:150 acetaldehyde, acetone, methyl ethyl ketone, and water for a total volume of 200 mL. During sparging, N$_2$ gas was fed through the bottom of the vessel at a flow rate of 250 SCCM with the vessel controlled to 5 psig and 5° C. These conditions were determined based on using the Antoine equation to target the desired concentration of each component in the N$_2$ stream. The vessel was further equipped with a bypass to allow for N$_2$ gas to be directed past the sparging apparatus during desorption experiments.

Adsorption experiments were conducted at 25° C. and entailed flowing the component laden nitrogen stream from the sparging apparatus through a packed bed containing 30 g of commercial adsorbent (Sigma-Aldrich, Molecular Sieve 13X, 4-8 mesh) housed within the CHGF unit. To ensure uniform gas distribution before and after the adsorbent bed, beds of 5 mm glass beads were packed upstream and downstream of the adsorbent bed. The glass bead bed and adsorbent bed volumes were 95 mL and 50 mL, respectively. Component breakthrough and subsequent saturation were monitored real-time via MBMS by tracking the associated ion signals (acetone, m/z=58; acetaldehyde, m/z=44; methyl ethyl ketone, m/z=72; water, m/z=18). Upon adsorbent bed saturation, as indicated by a plateau in the component breakthrough signals, desorption was started by bypassing the sparging apparatus to direct $N_2$ (250 SCCM) over the bed at about 25° C. Initial desorption was conducted until the ion signals approached baseline, after which the temperature was increased. Heated desorption was conducted at about 150° C. for the acetone experiments, while for the mixture experiments, heated desorption was started at about 50° C. and increased to about 150° C. in 25° C. increments based on ion signals leveling off during each incremental increase. Multiple adsorption-desorption cycles were completed using acetone to assess adsorbent cycling capacity. An acetone control experiment was also conducted using a bed of 5 mm glass beads in place of the adsorbent bed; the control glass bead bed was of the same volume (50 mL) occupied by the adsorbent. Weights were taken of the adsorbent bed at breakthrough, at saturation, and after desorption to aide in tracking adsorption capacity. Acetone capacity was then determined via gravimetric analysis of the adsorbent. Further, modeling of the separation of desorbed species showed high purities are achievable via further distillation/extraction operations, and that specific optimized separation sequences can be developed based on the inlet compositions and desired output products.

As shown herein, in addition to 13X zeolite, silica gel was tested as an adsorbent in an adsorption unit. Adsorption experiments testing a zeolite and a silica gel were performed on a plug-flow system utilizing a ⅜" S. S. O.D. tube as the adsorber. Two commercially available sorbents, obtained from Grace, were evaluated: Molecular Sieve 13x (MS-13x) and Silica-Gel 40 (SG-40). The adsorbent materials (2.0-2.5 g) were held in place using quartz wool. Adsorption was performed at room temperature (22° C.) and desorption was performed by rapidly heating from room temperature to 200° C. (~4 min) in an inert flow. Desorption was allowed to occur until no further desorption of acetone was observed (~90 min). The gas lines upstream and downstream of the adsorbent were heated to 100° C. to avoid condensation on the lines. In some experiments, the adsorbent was removed following adsorption and weighed on a balance before being quickly (~1 min) placed in a sealed glass vial and stored before thermogravimetric analysis (TGA) experiments.

Acetone, 2-butanone and water were introduced via bubblers at room temperature. It was assumed that the gas headspace in the bubbler reached the liquid-vapor equilibrium in the case of the pure-component bubblers (acetone and water) and the saturation was tested by changing the flow rates and observing the exit vapor concentration. Table 5 shows the experimental conditions used to introduce neat acetone as well as acetone mixed with light gases, water and 2-butanone, and Table 6 shows the conditions for a model mixture compared to the measured composition of the light gas stream. When acetone and 2-butanone were both introduced, a bubbler containing a 70:30 by weight, liquid mixture of acetone:butanone was used to produce a gas-liquid equilibrium with 83 vol % acetone and 17% 2-butanone in the vapor. The GC was then used to determine the inlet concentration of acetone and 2-butanone as the acetone vapor pressure is suppressed when it is mixed with 2-butanone. It should be noted that the acetone and 2-butanone concentrations were not intentionally varied during the reaction campaign but the difference in the liquid/gas equilibrium leads to a change in composition over time (acetone is preferentially lost). This was negligible over the course of a single experiment as the inlet and saturated acetone levels were found to be constant but was noticeable over the course of several experiments.

TABLE 5

Gas flow rates for adsorption experiments and associated light oxygenate flows during experiments.

| | Flow rates [sccm] for adsorption experiments | | | |
|---|---|---|---|---|
| | Acetone Only | Acetone + Light Gases | Acetone + Light Gases + Water | Acetone + Light Gases + Water + 2-Butanone |
| He to acetone bubbler | 10 | 10 | 10 | n/a |
| He to 70/30 acetone/butanone bubbler | | | | 7.5 |
| *Through water bubbler in blue | | | * | * |
| Helium (He) | 190 | 45.2 | 45.2 | 45.2 |
| Hydrogen (H2) | | 100 | 100 | 100 |
| Carbon monoxide (CO) | | 22.6 | 22.6 | 22.6 |
| Carbon dioxide (CO2) | | 9.7 | 9.7 | 9.7 |
| Methane (CH4) | | 12.5 | 12.5 | 12.5 |
| Total flow from MFCs | 200 | 200 | 200 | 197.5 |
| Oxygenate flows, sccm [mg/min] | | | | |
| Acetone | 4.94 (12.8) | 4.94 (12.8) | 4.94 (12.8) | 2.3-3.0 (6.0-7.8) |
| Water | | | 6.3 (5.06) | 6.3 (5.06) |
| Butanone | | | | 0.53-0.68 (1.7-2.2) |

TABLE 6

Comparison of molar ratios found in post-condenser CFP vapors following upgrading using $Pt/TiO_2$ and the model compound streams during adsorption experiments.

| | Relative Molar Quantities | | |
|---|---|---|---|
| Chemical Species | Bench-scale reactor, post-condenser (Real vapors) | Micro-scale studies (Model Compounds) | |
| HYDROGEN | 100.0 | 100.0 | Light Gases |
| CO | 22.6 | 22.6 | |
| CO2 | 9.7 | 9.7 | |
| METHANE | 12.5 | 12.5 | |
| ACETONE | 1.0 | 2.3-3.0 | Condensable |
| 2-BUTANONE | 0.2 | 0.5-0.7 | |
| WATER | 2.1 | 6.3 | |
| ACETALDEHYDE | 1.1 | 0.0 | Not included in model studies |
| ETHANE | 2.1 | 0.0 | |
| PROPYLENE | 0.5 | 0.0 | |
| PROPANE | 0.6 | 0.0 | |

The ratios of light gas components were selected to achieve the correct molar ratios as observed in the post-condenser gas stream following catalytic fast pyrolysis using a $Pt/TiO_2$ catalyst (see Table 6). The ratios are presented relative to hydrogen (the most abundant species on a molar basis) and the model compound experiments accounted for >95% of the detectable compounds as found in the real process gas. The condensable component concentrations were selected to mimic the ratios found in the real effluent, though water is slightly over-represented, which may lead to a lower observed/reported uptake capacity of the other oxygenates (acetone, 2-butanone) since the uptake of water leads to a decrease in the uptake of acetone. The main components that were not included in these model studies are also shown. Ethane, propane, and propylene are not expected to have an effect on the adsorption capacity and there are plans to study the influence of acetaldehyde.

Figure 7:
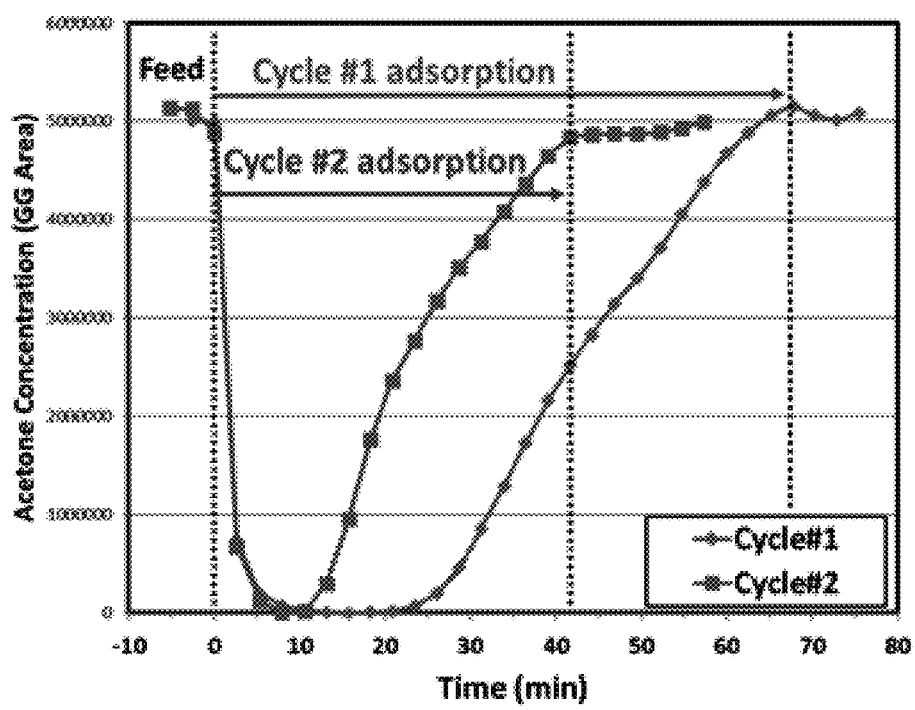
FIG. 7 illustrates two sequential acetone-only adsorption cycles on Molecular Sieve 13x showing incomplete regeneration of this adsorbent, according to some embodiments of the present disclosure. Cycle #1 uptake 21 wt %; Cycle #2 uptake=12 wt %.
Figure 8:
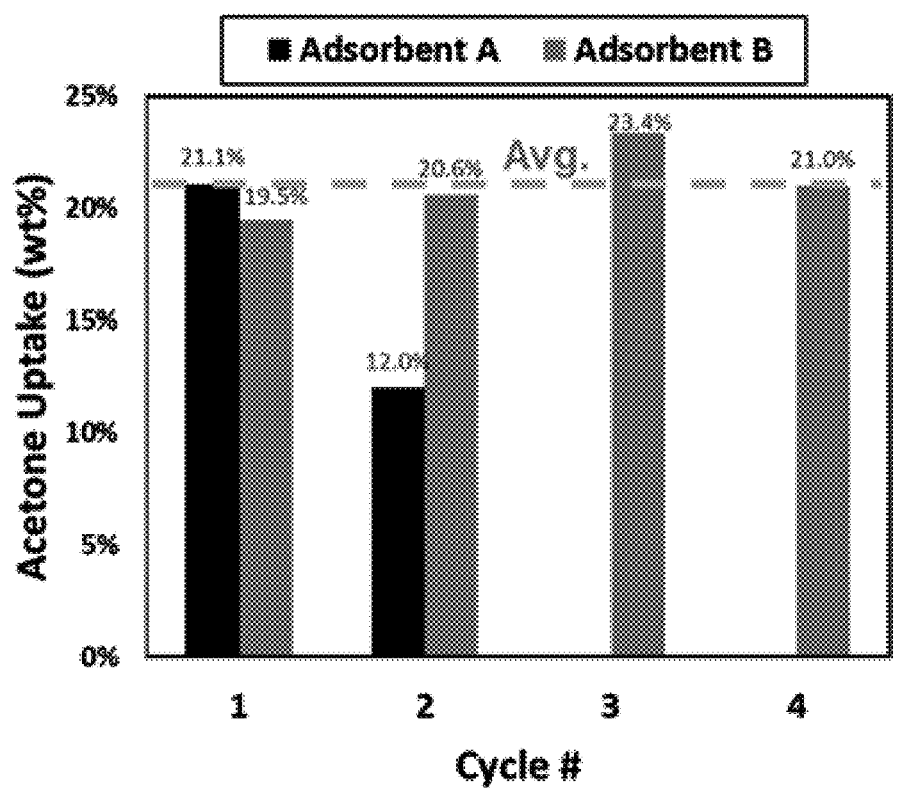
FIG. 8 illustrates a comparison of acetone uptake capacity during sequential adsorption/desorption cycles on Molecular Sieve 13x (Adsorbent A) and Silica Gel 40 (Adsorbent B), according to some embodiments of the present disclosure. Silica Gel 40 showed an average uptake of 21.1 wt %+/− 1.6%.

Initial experiments were performed using Molecular Sieve 13x (Sorbent A) to determine its acetone-uptake capacity (see FIG. 7). In the experiment, a feed flow was established bypassing the adsorbent, and then flow was switched to pass over the adsorbent until it became saturated. At this point, the bubbler was bypassed, and the sorbent was heated to 200° C. to measure the desorbed species. In this experiment, it was evident that the Molecular Sieve 13x was not fully regenerable, as its acetone uptake capacities for Cycle #1 and Cycle #2 were 21 wt % and 12 wt %, respectively. Another adsorbent, Silica Gel 40, was tested and appeared to be fully regenerable with comparable uptake capacity during acetone-only adsorption experiments as the Molecular Sieve 13x. FIG. 8 compares the adsorption capacity for sequential cycles for the two adsorbents.

Figure 9:
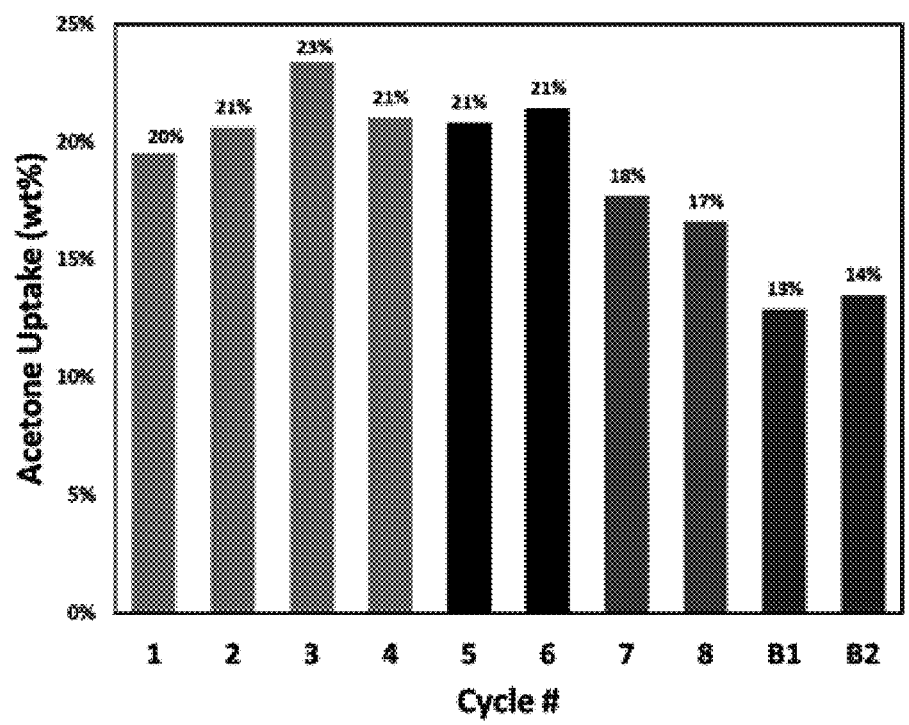
FIG. 9 illustrates acetone uptake capacity during 8 sequential adsorption/desorption cycles on Silica Gel 40x, according to some embodiments of the present disclosure. Cycle #1-4 (acetone only); Cycle #5 and 6 (acetone+light gases); Cycle #7 and 8 (acetone+light gases+water); Cycle #B1 and B2 (new sorbent bed, acetone+light gases+water+ 2-butanone).

Because the Silica Gel 40 adsorbent could be fully regenerated, it was evaluated using gas streams of increasingly complex mixtures to simulate the post-condenser vapor stream following CFP upgrading over a $Pt/TiO_2$ catalyst and these results for acetone-uptake are shown in FIG. 9. In these experiments, a single adsorbent bed was tested for four acetone-only adsorption/desorption cycles, two acetone+light gases cycles, two acetone+light gases+water cycles. This adsorbent was then removed from the reactor, weighed (21.2 wt % gain) and then a TGA experiment with a ramp to 200° C. was performed (21.5 wt % loss). A fresh adsorbent was then used for two sequential adsorption cycles of acetone+light gases+water+2-butanone and then removed, weighed, and TGA performed on it. To check for the analytical accuracy and determine if there were residual species remaining on the adsorbent follow regeneration, two TGA experiments were conducting on post-reaction/adsorption materials. Namely, following Cycle #8 and Cycle #B2 from FIG. 9 (3), the adsorbents were weighed and then weight loss profiles measured using TGA and these results are shown in Table 7.

TABLE 7

Comparison of weight gain (by weighing on a balance) and weight loss (by TGA) during heating in inert and holding at 200° C. for two Silica Gel 40x sorbents.

| Compounds during adsorption (at 22° C.) | Adsorbed mass by direct weighing (adsorbent basis) | Desorbed mass at 200° C. by TGA/FTIR (adsorbent basis) |
|---|---|---|
| Acetone + water + light gases | 21.2 wt % | 21.5 wt % |
| Acetone + water + butanone + light gases | 24.8 wt % | 25.4 wt % |

Figure 10:
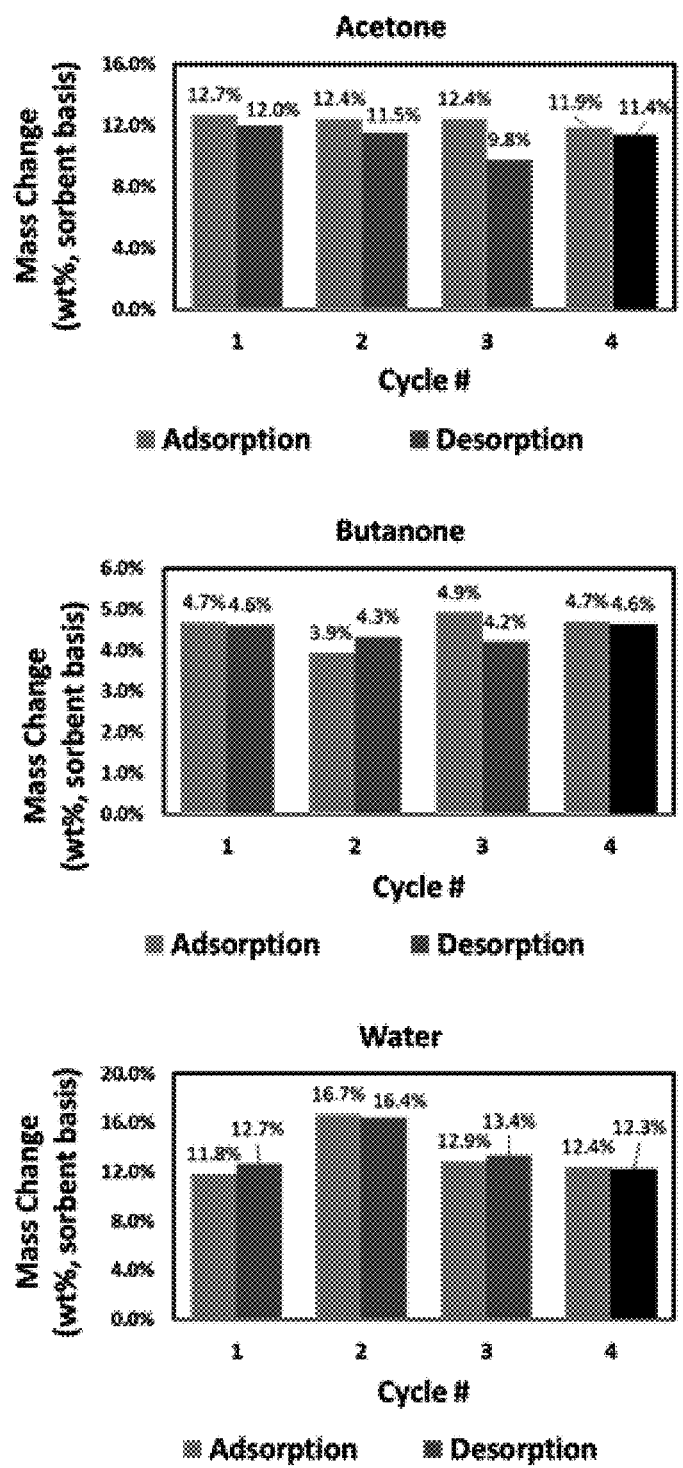
FIG. 10 illustrates adsorption and desorption mass change during each of four cycles on Silica Gel 40 sorbent when acetone, water, 2-butanone, $H_2$, CO, $CO_2$, and $CH_4$ were present in the vapor, according to some embodiments of the present disclosure. The desorption mass for Cycle #4 was determine by direct weighing, followed by TGA and total mass loss was proportionally allocated to weight during desorption.
Figure 11:
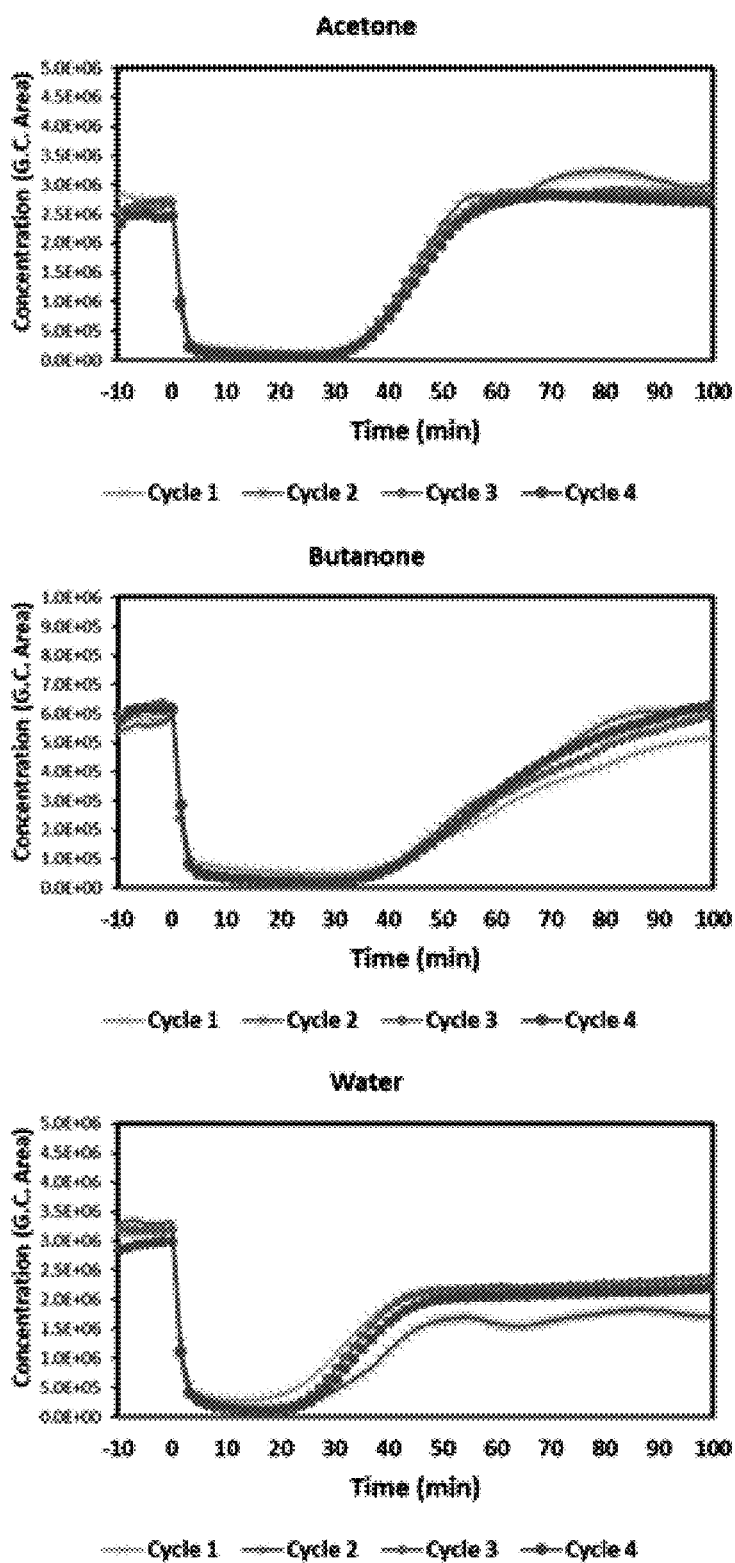
FIG. 11 illustrates an overlay of GC areas during four sequential adsorption/desorption cycles on Silica Gel 40, according to some embodiments of the present disclosure.

Because the Silica Gel 40 sorbent showed promise for light oxygenate capture, it was evaluated for a greater number (4) adsorption/desorption cycles and the weight gain for each condensable component (acetone, 2-butanone, water) for each cycle, as well as the overlay of the uptake curves are shown in FIG. 10 and FIG. 11, respectively. The uptake capacity is relatively constant and within the standard deviation from the acetone-only experiments. The lower desorption capacity for acetone as compared to the adsorption capacity may be attributed to rapid heating leading to a high desorption rate that is not fully captured by the GC analysis which only gets a gas stream composition every ~1.6 minutes or, potentially non-linearity in the GC-response at the higher concentrations, which were above the calibration range. The acetone is presumed to fully desorb based on TGA experiments.

Studies using the model mixture shown in Table 6 were conducted using silica gel with a realistic light gas stream to determine; 1) adsorption loadings of acetone and 2-butanone on the silica gel, 2) the impact of realistic water vapor concentrations and 3) the amount of the oxygenate desorbed during the 200° C. temperature swing. Three experiments were conducted in triplicate and the results are shown in Table 8. As can be seen, the loading for acetone is similar to that obtained for neat acetone and the desorption is nearly quantitative.

TABLE 8

Results from experiments with light gas model mixture shown in FIG. 4. Lower desorption as compared to adsorption is attributed to analytical method incompletely capturing the high rate of release of acetone/butanone during the rapid heating.

| | Acetone | 2-Butanone |
|---|---|---|
| Adsorption load (g/g silica gel) | 12.4% ± 0.3% | 4.6% ± 0.4% |
| Percent desorbed during temperature swing | 90% ± 8% | 97% ± 5% |

Figure 12:
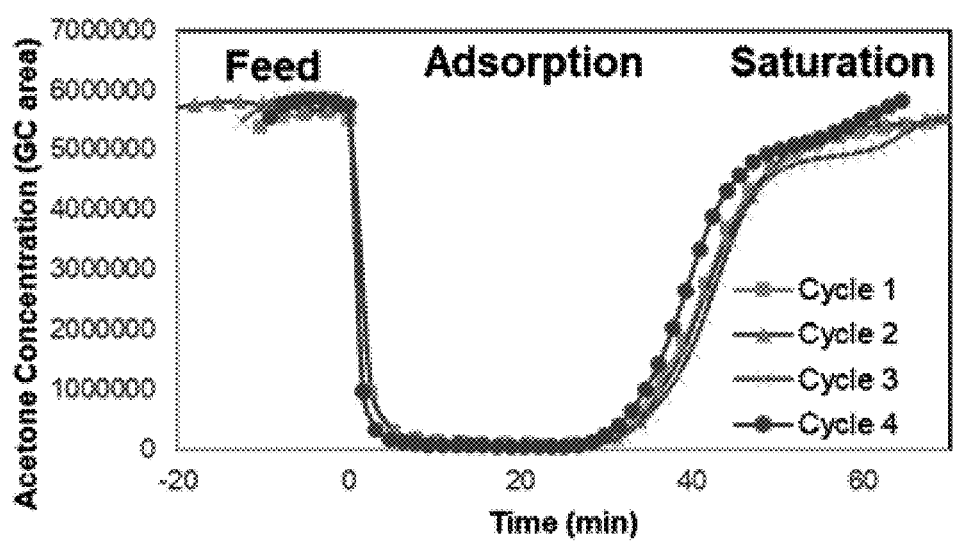
FIG. 12 illustrates acetone areas during four sequential acetone-only adsorption/desorption cycles on Silica Gel 40, according to some embodiments of the present disclosure.
Figure 13:
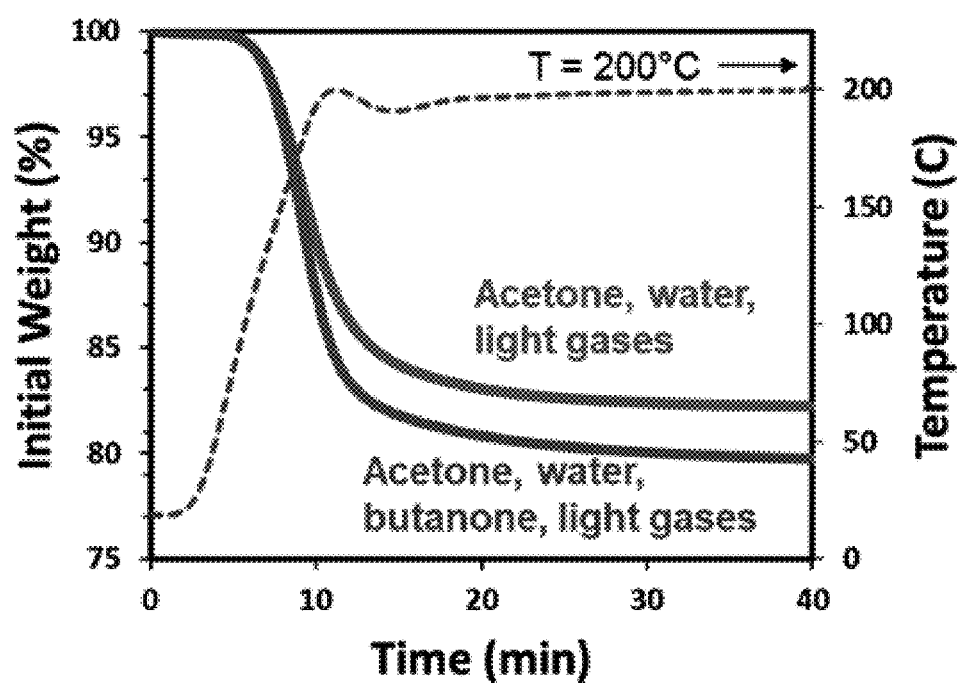
FIG. 13 illustrates TGA profiles of Silica Gel 40 during simulated desorption/regeneration experiments, according to some embodiments of the present disclosure. Y-axis is on a saturated-sorbent basis.

FIGS. 12 and 13 illustrate additional adsorption experimental results, where FIG. 12 illustrates acetone areas during four sequential acetone-only adsorption/desorption cycles on Silica Gel 40 and FIG. 13 illustrates TGA profiles of Silica Gel 40 during simulated desorption/regeneration experiments. Y-axis is on a saturated-sorbent basis.

EXAMPLES

Example 1. A catalyst comprising: a support comprising a metal oxide; and a metal deposited on the support, wherein: the metal oxide comprises at least one of $TiO_2$, $Al_2O_3$, $SiO_2$, $CeO_2$, or $ZrO_2$, the metal comprises at least one of Pt, Pd, Ru Rh, Ni, or Mo, the metal is in the form of a particle, and the metal is present on the support at a concentration between about 0.1 wt % and about 5.0 wt %.

Example 2. The catalyst of Example 1, wherein the catalyst is at least partially crystalline.

Example 3. The catalyst of Example 2, wherein the catalyst is between about 80 wt % crystalline and about 99 wt % crystalline.

Example 4. The catalyst of Example 1, wherein the metal is deposited on a surface of the metal oxide.

Example 5. The catalyst of Example 4, wherein the surface comprises an external surface and an internal surface.

Example 6. The catalyst of Example 1, further comprising a surface area between about 35 $m^2/g$ and about 200 $m^2/g$.

Example 7. The catalyst of Example 6, wherein the surface area is between about 35 $m^2/g$ and about 75 $m^2/g$.

Example 8. The catalyst of Example 1, further comprising a pore volume between 0.20 $cm^3/g$ and 0.55 $cm^3/g$.

Example 9. The catalyst of Example 1, further comprising a median pore diameter between 290 Å and 380 Å.

Example 10. The catalyst of Example 1, wherein the catalyst has a characteristic length between about 300 μm and about 1200 μm.

Example 11. The catalyst of Example 1, wherein the catalyst has a characteristic length between about 470 μm and about 550 μm.

Example 12. The catalyst of Example 1, wherein the catalyst is in a form comprising at least one of a sphere, a cylinder, a pellet, a trilobe, a quadrilobe, or an irregular shape.

Example 13. The catalyst of Example 1, wherein the metal particle has a characteristic length between about 0.5 nm and about 20 nm.

Example 14. The catalyst of Example 1 comprising: a surface area between about 50 $m^2/g$ and about 60 $m^2/g$; a pore volume between about 0.30 $cm^3/g$ and about 45 $cm^3/g$; and a median pore diameter between about 300 Å and about 360 Å, wherein: the metal oxide comprises $TiO_2$, the metal comprises Pt, and the concentration of the metal on the support is about 0.5 wt %.

Example 15. A method comprising: treating a pyrolysis vapor in an upgrading unit to produce an upgraded pyrolysis product comprising an oxygenated compound, wherein: the treating comprises contacting the pyrolysis vapor with a catalyst comprising: a support comprising a metal oxide; and a metal deposited on the support, wherein: the metal oxide comprises at least one of $TiO_2$, $Al_2O_3$, $SiO_2$, $CeO_2$, or $ZrO_2$, the metal comprises at least one of Pt, Pd, Ru Rh, Ni, or Mo, and the metal is present on the support at a concentration between 0.1 wt % and 10 wt %.

Example 16. The method of Example 15, wherein the treating is performed in a packed bed reactor.

Example 17. The method of Example 16, wherein: the packed bed reactor comprises a first reactor and a second reactor, while the first reactor is treating, the second reactor is regenerating the catalyst, and while the second reactor is treating, the first reactor is regenerating the catalyst.

Example 18. The method of Example 16, wherein the packed bed reactor is operated at a pressure between about 1 Barr and about 10 Barr.

Example 19. The method of Example 16, wherein the packed bed reactor is operated at a weight hourly space velocity between about 1.0 grams of biomass per gram of catalyst per hour and about 5.0 grams of biomass per gram of catalyst per hour.

Example 20. The method of Example 15, further comprising cofeeding with the pyrolysis vapor a gas stream comprising hydrogen at a concentration between about 50 wt % and about 100 wt %.

Example 21. The method of Example 15, further comprising regenerating the catalyst, wherein the regenerating comprises heating the catalyst.

Example 22. The method of Example 21, wherein the heating comprises the catalyst reaching an average temperature between about 400° C. and about 600° C.

Example 23. The method of Example 21, wherein the heating is performed in the presence of oxygen.

Example 24. The method of Example 15, wherein the oxygenated compound comprises at least one of acetaldehyde, acetone, or methyl ethyl ketone.

Example 25. The method of Example 15, further comprising separating the oxygenated compound from the upgraded pyrolysis product using an adsorption unit.

Example 26. The method of Example 15, wherein the adsorption unit contains a solid adsorbent comprising at least one of a zeolite or a silica gel.

Example 27. The method of Example 26 wherein the zeolite comprises a silica gel.

Example 28. The method of Example 25, wherein the oxygenated compound is recovered from the adsorption unit.

Example 29. The method of Example 15, wherein the adsorption unit comprises at least one of a pressure-swing unit or a temperature swing unit.

Example 30. The method of Example 15, further comprising, prior to the treating, pyrolyzing a biomass in a pyrolysis unit to produce the pyrolysis vapor.

Example 31. The method of Example 30, wherein the pyrolyzing is performed in a pyrolyzing reactor.

Example 32. The method of Example 31, wherein the pyrolyzing is performed at a temperature between about 400° C. and about 600° C.

Example 33. The method of Example 31, wherein the pyrolyzing is performed in a time period between 1 second and 10 seconds.

Example 34. The method of Example 30, wherein the biomass comprises at least one of pine wood or a forest waste.

Example 35. The method of Example 25, further comprising reacting at least a portion of the oxygenated compounds to produce higher molecular weight compounds.

Example 36. A method comprising: separating a pyrolysis-derived oxygenate from a stream, wherein: the separating is performed using adsorption.

Example 37. The method of Example 36, wherein the adsorption is performed using a solid adsorbent comprising at least one of a zeolite or a silica gel.

Example 38. The method of Example 37 wherein the solid adsorbent comprises a silica gel.

Example 39. The method of Example 36, further comprising, recovering the pyrolysis-derived oxygenate.

Example 40. The method of Example 15, wherein the adsorption is performed using at least one of a pressure-swing adsorption unit or a temperature swing adsorption unit.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A catalyst consisting of:
   a $TiO_2$ support; and
   platinum deposited on the $TiO_2$ support, wherein:
   the platinum is present on a surface of the $TiO_2$ support at a concentration between about 0.1 wt % and about 2.0 wt % relative to the $TiO_2$ support, and
   the catalyst is characterized by:
   a diameter between about 300 μm and about 1200 μm;
   a total surface area between about 35 $m^2/g$ and about 75 $m^2/g$;
   a pore volume between about 0.20 $cm^3/g$ and about 0.55 $cm^3/g$;
   a median pore diameter between about 290 Å and about 380 Å; and
   the catalyst is synthesized using a solution processing method using only $TiO_2$, a platinum source, water, and a buffer.

2. The catalyst of claim 1, wherein the catalyst is at least partially crystalline.

3. The catalyst of claim 2, wherein the catalyst is between about 80 wt % crystalline and about 99 wt % crystalline.

4. The catalyst of claim 1, wherein the catalyst has a diameter between about 470 μm and about 550 μm.

5. The catalyst of claim 1, wherein the catalyst has a sphericity of at least 96.1%.

6. The catalyst of claim 1, wherein the surface area is between about 50 $m^2/g$ and about 60 $m^2/g$.

7. The catalyst of claim 1, wherein the concentration of the platinum is greater than 0 wt % and less than 1 wt %.

8. A method comprising:
   treating a pyrolysis vapor in an upgrading unit to produce an upgraded pyrolysis product comprising an oxygenated compound, wherein:
   the treating comprises contacting the pyrolysis vapor with a catalyst consisting of:
   a $TiO_2$ support; and
   platinum deposited on the $TiO_2$ support, wherein:
   the platinum is present on a surface of the $TiO_2$ support at a concentration between about 0.1 wt % and about 2.0 wt % relative to the $TiO_2$ support, and the catalyst is characterized by:
   a diameter between about 300 μm and about 1200 μm;
   a total surface area between about 35 $m^2/g$ and about 75 $m^2/g$;
   a pore volume between about 0.20 $cm^3/g$ and about 0.55 $cm^3/g$;
   a median pore diameter between about 290 Å and about 380 Å.

9. The method of claim 8, wherein the treating is performed in a packed bed reactor.

10. The method of claim 9, wherein:
    the packed bed reactor comprises a first reactor and a second reactor,
    while the first reactor is treating, the second reactor is regenerating the catalyst, and
    while the second reactor is treating, the first reactor is regenerating the catalyst.

11. The method of claim 9, wherein the packed bed reactor is operated at a pressure between about 1 Barr and about 10 Barr.

12. The method of claim 9, wherein the packed bed reactor is operated at a weight hourly space velocity between about 1.0 grams of biomass per gram of catalyst per hour and about 5.0 grams of biomass per gram of catalyst per hour.

* * * * *